(12) United States Patent
Kitada et al.

(10) Patent No.: US 11,433,756 B2
(45) Date of Patent: *Sep. 6, 2022

(54) DRIVE DEVICE

(71) Applicant: EXEDY Corporation, Neyagawa (JP)

(72) Inventors: Kenji Kitada, Neyagawa (JP); Yuki Kawahara, Neyagawa (JP); Tomohiro Wada, Neyagawa (JP); Takuma Shimada, Neyagawa (JP); Yukiyoshi Takada, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/397,545

(22) Filed: Aug. 9, 2021

(65) Prior Publication Data

US 2022/0072946 A1 Mar. 10, 2022

(30) Foreign Application Priority Data

Sep. 8, 2020 (JP) .............................. JP2020-150313

(51) Int. Cl.
| | |
|---|---|
| *B60K 6/40* | (2007.10) |
| *B60K 6/26* | (2007.10) |
| *B60K 6/387* | (2007.10) |
| *H02K 7/075* | (2006.01) |
| *H02K 7/10* | (2006.01) |
| *H02K 11/21* | (2016.01) |

(Continued)

(52) U.S. Cl.
CPC ................. *B60K 6/40* (2013.01); *B60K 6/26* (2013.01); *B60K 6/387* (2013.01); *F16H 45/02* (2013.01); *H02K 7/075* (2013.01); *H02K 7/10* (2013.01); *H02K 11/21* (2016.01); *H02K 24/00* (2013.01); *B60K 2006/268* (2013.01); *B60L 7/10* (2013.01); *B60Y 2200/92* (2013.01); *B60Y 2400/426* (2013.01); *B60Y 2400/46* (2013.01); *B60Y 2400/60* (2013.01); *F16H 2045/0221* (2013.01)

(58) Field of Classification Search
CPC . B60K 6/40; B60K 6/26; B60K 6/387; B60K 2006/268; F16H 45/02; F16H 2045/0221; H02K 7/10; H02K 7/075; H02K 11/21; H02K 24/00; B60L 7/10
See application file for complete search history.

(56) References Cited

U.S. PATENT DOCUMENTS

| | | | | |
|---|---|---|---|---|
| 9,180,873 | B2 * | 11/2015 | Miyazaki | ............ B60W 10/026 |
| 2011/0121692 | A1 * | 5/2011 | Iwase | ...................... B60K 6/48 |
| | | | | 192/85.01 |

(Continued)

FOREIGN PATENT DOCUMENTS

JP 2005-201402 A 7/2005

*Primary Examiner* — David J Hlavka

(74) *Attorney, Agent, or Firm* — United IP Counselors, LLC

(57) ABSTRACT

A drive device includes a fluid coupling, a rotary electrical machine, and a damper device. The fluid coupling includes an input unit and an output unit. The input unit includes an impeller. The output unit includes a turbine. The rotary electrical machine includes a first stator and a rotor. The first stator is disposed in a non-rotatable manner. The rotor is attached to the output unit. The damper device is disposed axially adjacent to the fluid coupling. The damper device is connected to the input unit.

14 Claims, 2 Drawing Sheets

(51) Int. Cl.
*H02K 24/00* (2006.01)
*F16H 45/02* (2006.01)
*B60L 7/10* (2006.01)

(56) References Cited

U.S. PATENT DOCUMENTS

2013/0111891 A1* 5/2013 Iwase ................... F16D 48/062
  60/347
2021/0070161 A1* 3/2021 Kawahara ............... F16H 41/24

\* cited by examiner

DRIVE DEVICE

CROSS-REFERENCE TO RELATED APPLICATIONS

This application claims priority to Japanese Patent Application No. 2020-150313 filed Sep. 8, 2020. The entire contents of that application are incorporated by reference herein in their entirety.

TECHNICAL FIELD

The present invention relates to a drive device.

BACKGROUND ART

Japan Laid-open Patent Application Publication No. 2005-201402 discloses a drive device disposed between an engine and a transmission. The drive device includes a rotary electrical machine and a torque converter.

In the drive device described above, the engine and the rotary electrical machine are directly connected to each other. Hence, the engine cannot be disconnected from the rotary electrical machine in regenerative operation of the rotary electrical machine. Because of this, regenerative efficiency degrades in the rotary electrical machine due to friction loss of the engine and/or so forth.

It is an object of the present invention to enhance regenerative efficiency in a rotary electrical machine.

BRIEF SUMMARY

A drive device according to an aspect of the present invention includes a fluid coupling, a rotary electrical machine, and a damper device. The fluid coupling includes an input unit and an output unit. The input unit includes an impeller. The output unit includes a turbine. The rotary electrical machine includes a first stator and a rotor. The first stator is disposed in a non-rotatable manner. The rotor is attached to the output unit. The damper device is disposed axially adjacent to the fluid coupling. The damper device is connected to the input unit.

According to the configuration, the rotor of the rotary electrical machine is attached to the output unit of the fluid coupling. Besides, a torque outputted from an engine is transmitted to the input unit of the fluid coupling through the damper device. In other words, the fluid coupling intervenes between the engine and the rotor of the rotary electrical machine, whereby the engine and the rotor are made rotatable relative to each other. Because of this, friction loss of the engine and/or so forth can be reduced in regenerative operation of the rotary electrical machine, whereby regenerative efficiency can be enhanced. Furthermore, a clutch is not required to be provided between the damper device and the fluid coupling in order to disconnect the engine and the rotary electrical machine from each other.

Preferably, the output unit includes a cover coupled to the turbine. The cover and the turbine form at least part of an outer shell of the fluid coupling. The impeller is opposed to the turbine inside the outer shell.

Preferably, the rotor is attached to the outer shell.

Preferably, the drive device further includes a transmission shaft. The transmission shaft extends to penetrate the outer shell. The transmission shaft connects the damper device and the impeller to each other.

Preferably, the drive device further includes a first bearing member. The first bearing member is fixed to a crankshaft of an engine and supports the transmission shaft such that the transmission shaft is made rotatable.

Preferably, the outer shell of the fluid coupling includes an inner tubular portion axially extending from an inner peripheral end thereof. The transmission shaft axially extends inside the inner tubular portion. The drive device further includes a seal member and a second bearing member. The seal member is disposed between the inner tubular portion and the transmission shaft. The second bearing member is fixed to either the crankshaft of the engine or a member attached to the crankshaft. The second bearing member supports the outer shell of the fluid coupling from radially outside such that the outer shell is made rotatable.

Preferably, the second bearing member supports the inner tubular portion such that the inner tubular portion is made rotatable.

Preferably, the fluid coupling further includes a lock-up clutch device configured to allow and block transmission of a torque between the input unit and the output unit.

Preferably, the impeller includes an impeller shell, an impeller blade, an impeller hub, and a first one-way clutch. The impeller blade is attached to the impeller shell. The impeller hub is a member, to which the torque is inputted. The first one-way clutch is disposed between the impeller shell and the impeller hub. The lock-up clutch device is configured to be unitarily rotated with the impeller hub.

Preferably, the impeller includes an impeller shell, an impeller blade, an impeller hub, and a first one-way clutch. The impeller blade is attached to the impeller shell. The impeller hub is a member, to which the torque is inputted. The first one-way clutch is disposed between the impeller shell and the impeller hub.

Preferably, the damper device includes an input plate, an output member, and an elastic member. The input plate is attached to the crankshaft of the engine. The output member outputs the torque to the transmission shaft. The elastic member elastically couples the input plate and the output member.

Preferably, the elastic member is a coil spring. A center of the elastic member does not overlap the rotor of the rotary electrical machine in an axial view.

Preferably, the drive device further includes a starter ring gear. The starter ring gear is configured to transmit a power to the crankshaft of the engine. The starter ring gear is disposed radially outside a coil end of the rotary electrical machine. The starter ring gear overlaps the coil end in a radial view.

Preferably, the drive device further includes an angle sensor. The angle sensor is disposed radially inside a center of a torus of the fluid coupling. The angle sensor is disposed to overlap the torus in the radial view.

Overall, according to the present invention, regenerative efficiency can be enhanced in a rotary electrical machine.

DETAILED DESCRIPTION

A drive device according to the present preferred embodiment will be hereinafter explained with reference to drawings. It should be noted that in the following explanation, the term "axial direction" refers to an extending direction of a rotational axis of the drive device. The term "first side in the axial direction" corresponds to the left side in FIG. 1, whereas the term "second side in the axial direction" corresponds to the right side in FIG. 1. An engine is disposed on the first side of the drive device in the axial direction, whereas a transmission is disposed on the second side of the drive device in the axial direction. On the other hand, the term "circumferential direction" refers to a circumferential direction of an imaginary circle about the rotational axis, whereas the term "radial direction" refers to a radial direction of the imaginary circle about the rotational axis.

[Drive Device]

Figure 1:
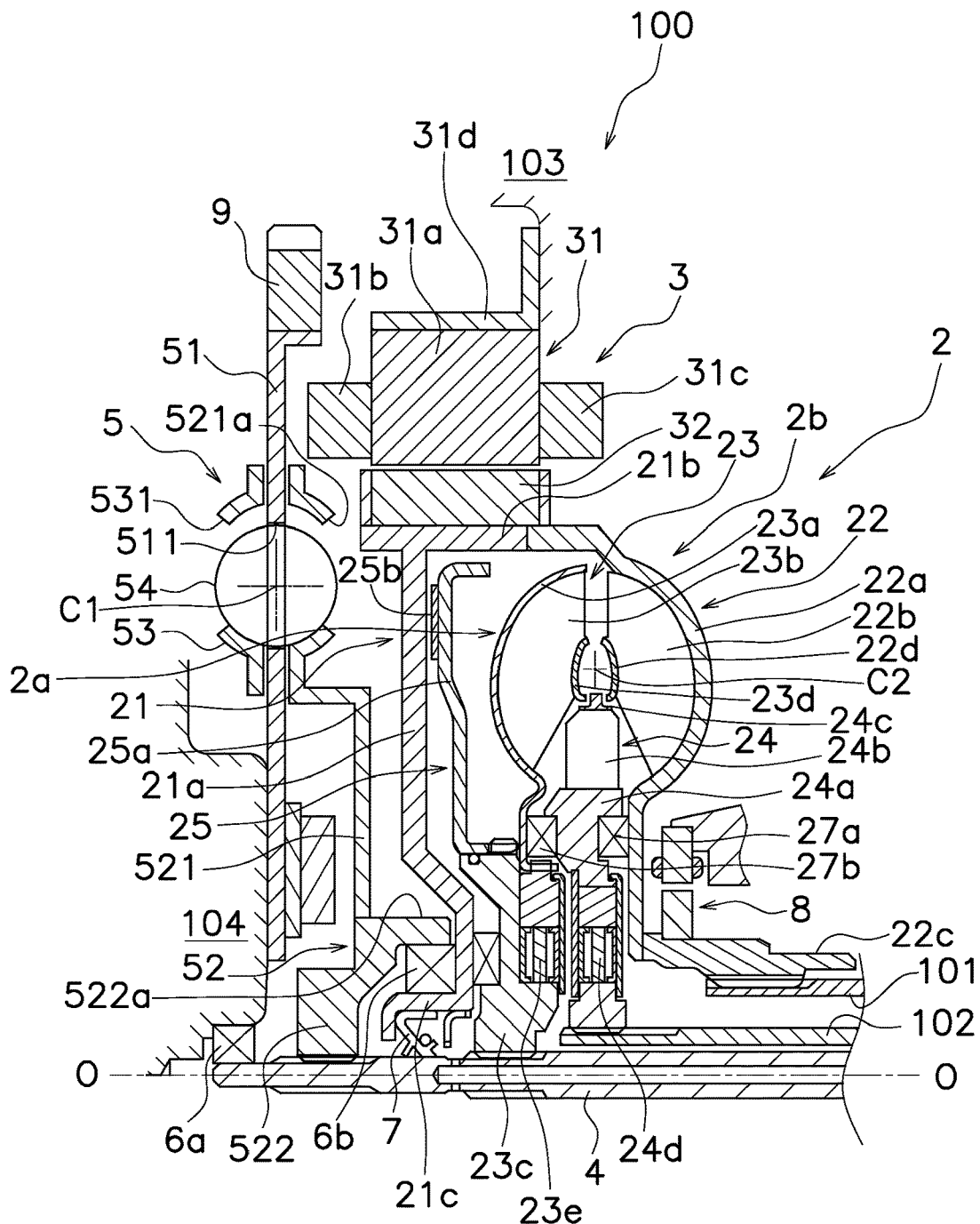
FIG. 1 is a cross-sectional view of a drive device.

As shown in FIG. 1, a drive device 100 includes a torque converter 2 (exemplary fluid coupling), a rotary electrical machine 3, and a transmission shaft 4. Besides, the drive device 100 includes a damper device 5, a first bearing member 6a, a second bearing member 6b, a seal member 7, and an angle sensor 8. The drive device 100 is disposed in a torque transmission path extending from the engine (not shown in the drawings) to the transmission.

[Torque Converter]

The torque converter 2 is configured such that a torque is inputted thereto from the first side in the axial direction and is outputted therefrom to the second side in the axial direction. It should be noted that, in the present preferred embodiment, the torque converter 2 is configured such that a torque is inputted thereto from the engine and is outputted therefrom to the transmission.

The torque converter 2 includes an input unit 2a and an output unit 2b. Torque transmission is enabled from the input unit 2a to the output unit 2b through hydraulic oil contained in the torque converter 2. The input unit 2a and the output unit 2b are rotatable relative to each other. The input unit 2a of the torque converter 2 includes an impeller 23. The output unit 2b of the torque converter 2 includes a cover 21 and a turbine 22.

The torque converter 2 includes a second stator 24 and a lock-up clutch device 25. The torque converter 2 is rotated about a rotational axis O. The torque converter 2 is configured to transmit the torque from the engine to the transmission through a fluid.

[Cover]

The cover 21 composes part of an outer shell of the torque converter 2. The cover 21 is coupled to the turbine 22. The cover 21 includes a cover body 21a, an outer tubular portion 21b, and a boss portion 21c (exemplary inner tubular portion). The cover body 21a is a disc-shaped member including an opening in the middle thereof. The outer tubular portion 21b extends from the outer peripheral end of the cover body 21a to the second side in the axial direction.

The boss portion 21c extends from the inner peripheral end of the cover body 21a in the axial direction. When described in detail, the boss portion 21c extends from the inner peripheral end of the cover body 21a to the first side in the axial direction. It should be noted that the boss portion 21c can extend from the inner peripheral end of the cover body 21a to the second side in the axial direction. The boss portion 21c has a cylindrical shape. The boss portion 21c is bent radially inward at the distal end thereof

[Turbine]

The turbine 22 is fixed to the cover 21. The turbine 22 is unitarily rotated with the cover 21. The turbine 22 composes the outer shell of the torque converter 2 together with the cover 21. The turbine 22 includes a turbine shell 22a, a plurality of turbine blades 22b, a turbine hub 22c, and a turbine core 22d.

The turbine shell 22a composes part of the outer shell of the torque converter 2. It should be noted that the turbine shell 22a composes the outer shell of the torque converter 2 together with the turbine hub 22c and the cover 21. The turbine blades 22b are fixed to the inner side of the turbine shell 22a.

The turbine hub 22c is fixed to the inner peripheral end of the turbine shell 22a. The turbine hub 22c extends from the inner peripheral end of the turbine shell 22a to the second side in the axial direction. The turbine hub 22c has a cylindrical shape. The turbine hub 22c is provided with splines on the inner peripheral surface thereof. An input shaft 101 of the transmission is attached to the turbine hub 22c. When described in detail, the input shaft 101 of the transmission is spline-coupled to the turbine hub 22c. The turbine hub 22c outputs the torque to the input shaft 101. It should be noted that in the present preferred embodiment, the turbine hub 22c is provided as a member separated from the turbine shell 22a. However, the turbine hub 22c can be provided together with the turbine shell 22a as a single member.

[Impeller]

The impeller 23 is disposed inside the outer shell composed of the cover 21 and the turbine 22. The impeller 23 is axially opposed to the turbine 22. The impeller 23 includes an impeller shell 23a, a plurality of impeller blades 23b, an impeller hub 23c, an impeller core 23d, and a first one-way clutch 23e.

The impeller shell 23a is attached to the impeller hub 23c through the first one-way clutch 23e. The impeller blades 23b are fixed to the inner surface of the impeller shell 23a.

The impeller hub 23c is a member to which the torque outputted from the engine is inputted through the transmission shaft 4. The impeller hub 23c is attached to the inner peripheral end of the impeller shell 23a through the first one-way clutch 23e. The impeller hub 23c is provided with splines on the inner peripheral surface thereof.

The first one-way clutch 23e is disposed between the impeller shell 23a and the impeller hub 23c. The first one-way clutch 23e is configured to transmit a torque, inputted thereto from the transmission shaft 4, to the impeller shell 23a but is configured not to transmit a torque, inputted thereto from the impeller shell 23a, to the transmission shaft 4. When described in detail, the first one-way clutch 23e is configured to transmit a torque, inputted thereto from the impeller hub 23c, to the impeller shell 23a but is configured not to transmit a torque, inputted thereto from the impeller shell 23a, to the impeller hub 23c.

[Second Stator]

The second stator 24 is a mechanism for regulating the flow of hydraulic oil returning from the turbine 22 to the impeller 23. The second stator 24 is disposed between the turbine 22 and the impeller 23. The second stator 24 includes a stator shell 24a, a plurality of stator blades 24b provided on the outer peripheral surface of the stator shell 24a, a second stator core 24c, and a second one-way clutch 24d.

A first thrust bearing 27a is disposed between the second stator 24 and the turbine 22, whereas a second thrust bearing 27b is disposed between the second stator 24 and the impeller 23.

The second one-way clutch 24d is attached to the inner peripheral end of the stator shell 24a. Besides, the second one-way clutch 24d is supported by a stationary shaft 102 having a tubular shape. The stationary shaft 102 extends between the outer peripheral surface of the transmission shaft 4 and the inner peripheral surface of the turbine hub 22c. The stationary shaft 102 is disposed in a non-rotatable manner.

[Lock-Up Clutch Device]

The lock-up clutch device 25 is configured to allow and block transmission of a torque between the input unit 2a and the output unit 2b. In other words, the lock-up clutch device 25 is configured to allow and block transmission of the torque between the turbine 22 and the impeller 23. In the present preferred embodiment, the lock-up clutch device 25 allows and blocks transmission of the torque between the turbine 22 and the impeller 23 through the cover 21.

The lock-up clutch device 25 is disposed between the cover 21 and the impeller 23 and is configured to mechanically couple and decouple the both. The lock-up clutch device 25 includes a piston plate 25a and a friction material 25b.

The piston plate 25a is supported by the impeller hub 23c so as to be movable in the axial direction. Besides, the piston plate 25a is configured to be unitarily rotated with the impeller hub 23c. When moved toward the cover 21, the piston plate 25a is engaged by friction with the cover 21 and is unitarily rotated therewith.

The piston plate 25a has a disc shape and includes an opening in the middle thereof. The piston plate 25a is provided with the friction material 25b fixed to the cover 21-side surface of the outer peripheral end thereof. The friction material 25b has an annular shape. When the friction material 25b is pressed against the cover 21, the torque is transmitted from the piston plate 25a to the cover 21. In other words, the friction material 25b attached to the piston plate 25a is provided as a clutch part.

[Rotary Electrical Machine]

The rotary electrical machine 3 functions as an electric motor for rotating and driving a drive wheel. Besides, the rotary electrical machine 3 also functions as a power generator. For example, the rotary electrical machine 3 functions as the power generator in deceleration.

The rotary electrical machine 3 is disposed radially outside the torque converter 2. The rotary electrical machine 3 overlaps the torque converter 2 in a radial view. The rotary electrical machine 3 includes a first stator 31 and a rotor 32. The rotary electrical machine 3 is made in shape of an annulus about the rotational axis O.

[First Stator]

The first stator 31 is disposed in a non-rotatable manner. Specifically, the first stator 31 is attached to a housing 103. The first stator 31 can be directly attached to the housing 103, or alternatively, can be indirectly attached thereto.

The first stator 31 has an annular shape. The first stator 31 includes a first stator core 31a, a first coil end 31b, and a second coil end 31c.

The first stator core 31a has a cylindrical shape. The first stator core 31a is fixed to the housing 103 through an attachment member 31d. The first stator core 31a overlaps the torque converter 2 in the radial view.

The first stator core 31a is formed by laminating a plurality of magnetic steel plates. A stator coil is wound about the first stator core 31a. When described in detail, the stator coil is inserted into a plurality of slots produced between a plurality of teeth of the first stator core 31a.

The first and second coil ends 31b and 31c compose part of the stator coil. Specifically, the stator coil axially extends in part from the first stator core 31a as the first and second coil ends 31b and 31c.

The first and second coil ends 31b and 31c protrude from the first stator core 31a in opposite directions to each other. In the present preferred embodiment, the first coil end 31b protrudes from the first stator core 31a to the first side in the axial direction, whereas the second coil end 31c protrudes from the first stator core 31a to the second side in the axial direction. Each of the first and second coil ends 31b and 31c is entirely made in shape of an annulus about the rotational axis O.

The first coil end 31b does not overlap the torque converter 2 in the radial view. The first coil end 31b overlaps the damper device 5 in the radial view. On the other hand, the first stator core 31a overlaps the torque converter 2 in the radial view.

The second coil end 31c overlaps the torque converter 2 in the radial view. When described in detail, the second coil end 31c overlaps a torus of the torque converter 2. It should be noted that the torus of the torque converter 2 means a space enclosed by the turbine shell 22a and the impeller shell 23a.

[Rotor]

The rotor 32 is configured to be rotated about the rotational axis O. The rotor 32 is attached to the output unit 2b of the torque converter 2. When described in detail, the rotor 32 is attached to the outer shell of the torque converter 2. It should be noted that in the present preferred embodiment, the rotor 32 is attached to the outer tubular portion 21b of the cover 21. In other words, the rotor 32 is attached to the outer peripheral surface of the cover 21.

The rotor 32 has a cylindrical shape and is disposed radially inside the first stator 31. In other words, the rotary electrical machine 3 according to the present preferred embodiment is of an inner rotor type. The rotor 32 is opposed at the outer peripheral surface thereof to the inner peripheral surface of the first stator 31 at an interval.

[Damper Device]

The damper device 5 is disposed adjacent to the torque converter 2 in the axial direction. When described in detail, the damper device 5 is disposed between the engine and the torque converter 2. The damper device 5 is a device that a torque is inputted thereto from the engine and is outputted therefrom to the torque converter 2.

The damper device 5 is attached to a crankshaft 104 of the engine. The damper device 5 is disposed to be rotatable about the rotational axis O. The damper device 5 is connected to the input unit 2a of the torque converter 2. When described in detail, the damper device 5 is connected to the impeller 23 of the input unit 2a through the transmission shaft 4. Besides, a clutch, by which the engine and the rotary electrical machine 3 are disconnected from each other, does not intervene between the damper device 5 and the torque converter 2.

The damper device 5 includes an input plate 51, an output member 52, a retaining plate 53, and a plurality of elastic members 54.

The input plate 51 is made in shape of a disc including an opening in the middle thereof. The input plate 51 includes a plurality of accommodation portions 511. Each accommodation portion 511 extends in the circumferential direction. The accommodation portions 511 are aligned in the circumferential direction.

The input plate 51 is attached to the crankshaft 104. When described in detail, the input plate 51 is attached at the inner peripheral end thereof to the crankshaft 104. The input plate 51 is bent at the outer peripheral end thereof in the axial direction. In the present preferred embodiment, the input plate 51 is bent at the outer peripheral end thereof to the second side in the axial direction.

The input plate 51 is provided with a starter ring gear 9 attached to the outer peripheral surface thereof. The ring gear 9 is configured to transmit a torque to the crankshaft 104 through the input plate 51. The ring gear 9 is disposed radially outside the first coil end 31b. The ring gear 9 overlaps the first coil end 31b in the radial view.

The output member 52 outputs the torque to the transmission shaft 4. The output member 52 includes an output plate 521 and an output hub 522. The output plate 521 is fixed to the output hub 522 by rivets (not shown in the drawings) and/or so forth. It should be noted that the output plate 521 can be integrated with the output hub 522 as a single member.

The output plate 521 is disposed adjacent to the input plate 51. When described in detail, the output plate 521 is disposed on the second side of the input plate 51 in the axial direction.

The output plate 521 includes a plurality of window portions 521a. Each window portion 521a extends in the circumferential direction. The window portions 521a are disposed away from each other at intervals in the circumferential direction. The window portions 521a are provided in corresponding positions to the accommodation portions 511 of the input plate 51.

The output hub 522 is configured to be unitarily rotated with the transmission shaft 4. When described in detail, the output hub 522 is provided with splines on the inner peripheral surface thereof. Besides, the transmission shaft 4 is spline-coupled to the output hub 522.

The output hub 522 includes a protruding portion 522a protruding to the second side in the axial direction. The protruding portion 522a has a tubular shape. The protruding portion 522a is disposed radially outside the boss portion 21c of the cover 21. The protruding portion 522a and the boss portion 21c overlap each other in the radial view.

The retaining plate 53 is configured to be unitarily rotated with the output member 52. For example, the retaining plate 53 is attached to the output plate 521 by rivets (not shown in the drawings) and/or so forth. The input plate 51 is disposed between the retaining plate 53 and the output plate 521.

The retaining plate 53 includes a plurality of window portions 531. Each window portion 531 extends in the circumferential direction. The window portions 531 are disposed away from each other at intervals in the circumferential direction. The window portions 531 are provided in corresponding positions to the window portions 521a of the output plate 521.

The elastic members 54 are configured to elastically couple the input plate 51 and the output member 52 therethrough. The elastic members 54 are, for instance, coil springs. Each elastic member 54 is disposed inside a space defined by each accommodation portion 511 of the input plate 51, each window portion 521a of the output plate 521, and each window portion 531 of the retaining plate 53. Each elastic member 54 is disposed such that the center (C1) thereof does not overlap the rotor 32 in an axial view.

[Transmission Shaft]

The transmission shaft 4 extends along the rotational axis O. The transmission shaft 4 is rotatable about the rotational axis O. The transmission shaft 4 extends while penetrating the outer shell of the torque converter 2. When described in detail, the transmission shaft 4 axially extends through the interior of the boss portion 21c of the cover 21. The transmission shaft 4 extends from outside to inside of the torque converter 2 through the interior of the boss portion 21c.

The transmission shaft 4 is configured to transmit the torque, inputted thereto from the engine, to the impeller 23. The transmission shaft 4 is connected to the damper device 5 on the outside of the torque converter 2. When described in detail, the transmission shaft 4 is spline-coupled to the output member 52 of the damper device 5.

The transmission shaft 4 is connected to the impeller 23 in the interior of the torque converter 2. When described in detail, the transmission shaft 4 is spline-coupled to the impeller hub 23c. Because of this, the torque, outputted from the damper device 5, is transmitted to the impeller 23 through the transmission shaft 4. In other words, the damper device 5 is connected to the impeller 23 through the transmission shaft 4.

[First Bearing Member]

The first bearing member 6a is fixed to the crankshaft 104 of the engine. When described in detail, the first bearing member 6a is fitted into a recess of the crankshaft 104. The first bearing member 6a supports the transmission shaft 4 such that the transmission shaft 4 is made rotatable. When described in detail, the transmission shaft 4 is fitted at axially first side one of the ends thereof to the first bearing member 6a.

[Second Bearing Member]

The second bearing member 6b is fixed to the damper device 5. When described in detail, the second bearing member 6b is fitted into the protruding portion 522a of the output hub 522 of the damper device 5. The second bearing member 6b supports the cover 21 from radially outside. When described in detail, the boss portion 21c of the cover 21 is fitted into the second bearing member 6b. In other words, the second bearing member 6b is disposed between the damper device 5 and the cover 21. Because of this, the damper device 5 and the cover 21 are rotated relative to each other.

[Seal Member]

The seal member 7 is disposed between the boss portion 21c and the transmission shaft 4. The seal member 7 has an annular shape and seals between the boss portion 21c and the transmission shaft 4. The seal member 7 is configured to prevent the hydraulic oil, circulating in the interior of the torque converter 2, from leaking outside.

[Angle Sensor]

The angle sensor 8 is configured to detect the rotational speed of the rotor 32 of the rotary electrical machine 3. When described in detail, the angle sensor 8 is configured to detect the rotational speed of the outer shell of the torque converter 2 unitarily rotated with the rotor 32. It should be noted that in the present preferred embodiment, the angle sensor 8 is configured to detect the rotational speed of the turbine hub 22c. The angle sensor 8 is, for instance, a resolver.

The angle sensor 8 is disposed to overlap the torus of the torque converter 2 in a radial view. When described in detail, the angle sensor 8 overlaps the turbine 22 in the radial view.

The angle sensor 8 is disposed radially inside the center (C2) of the torus of the torque converter 2. The angle sensor 8 is disposed radially inside the turbine blades 22b. It should be noted that the center C2 of the torus is the center of a space enclosed by the turbine core 22d and the impeller core 23d. It should be also noted that when the torque converter 2 is of a coreless type, the center C2 of the torus is determined under the assumption that the torque converter 2 includes an impeller core and a turbine core.

[Modifications]

One preferred embodiment of the present invention has been explained above. However, the present invention is not limited to the above, and a variety of changes can be made without departing from the gist of the present invention.

Modification 1

Figure 2:
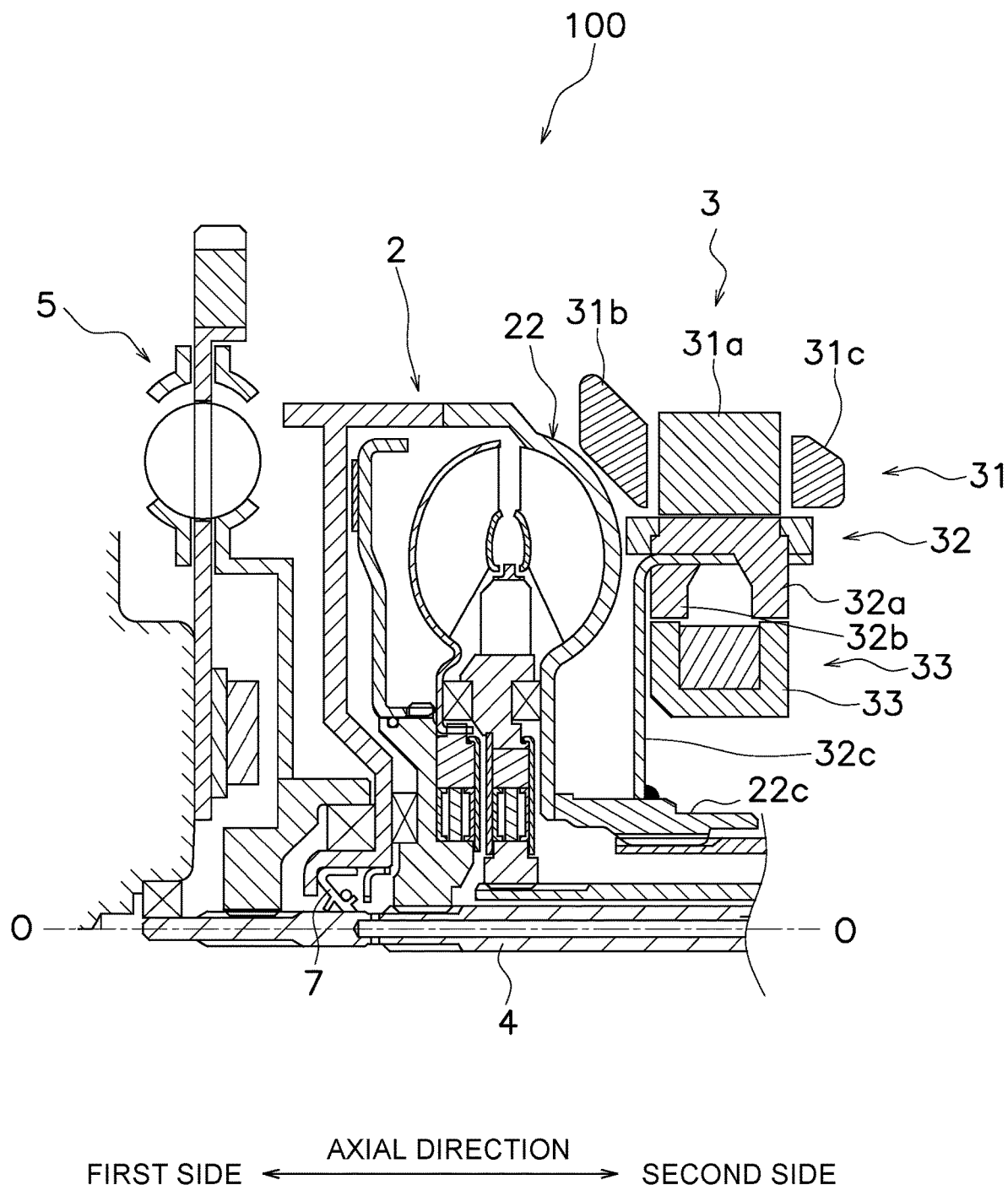
FIG. 2 is a cross-sectional view of a drive device according to a modification.

As shown in FIG. 2, the rotary electrical machine 3 can be disposed to overlap the torque converter 2 in an axial view. Specifically, the rotary electrical machine 3 can be disposed axially adjacent to the torque converter 2. Preferably, the rotary electrical machine 3 is disposed on the second side of the torque converter 2 in the axial direction. In other words, the torque converter 2, the rotary electrical machine 3, and the transmission (not shown in the drawings) are disposed in this order in the axial direction.

The rotor 32 of the rotary electrical machine 3 is attached to, for instance, the turbine 22. For example, the rotor 32 is attached to either the turbine shell 22a or the turbine hub 22c. The rotor 32 is attached to the torque converter 2 in a position located radially outside or inside the center C2 of the torus of the torque converter 2.

Modification 2

As shown in FIG. 2, the first coil end 31b can be bent radially outward. When described in detail, the first coil end 31b is bent radially outward from a base portion. It should be noted that the base portion is one of end portions of the first coil end 31b and is located close to the first stator core 31a in the axial direction. By contrast, a tip portion of the first coil end 31b is the other of the end portions of the first coil end 31b and is located away from the first stator core 31a in the axial direction.

The first coil end 31b overlaps the torus of the torque converter 2 in the radial view. When described in detail, the first coil end 31b overlaps the turbine 22 in the radial view.

The first coil end 31b is configured to increase in outer radius and inner radius from the base portion to the tip portion. It should be noted that the radius of the first coil end 31b refers to distance from the rotational axis O to a target position on the first coil end 31b. Because of this, the base portion and the tip portion of the first coil end 31b are substantially equal in radial dimension.

Modification 3

As shown in FIG. 2, the rotary electrical machine 3 can further include a field coil 33. In other words, the rotary electrical machine 3 includes the first stator 31, the rotor 32, and the field coil 33.

In the modification 3, the rotor 32 is made in form of a so-called claw pole type. Specifically, the rotor 32 includes a plurality of first claw poles 32a and a plurality of second claw poles 32b. The first claw poles 32a and the second claw poles 32b are alternately disposed in the circumferential direction. The first claw poles 32a and the second claw poles 32b are each made of a magnetic material such as iron. The first claw poles 32a and the second claw poles 32b are insulated from each other. For example, a non-magnetic material such as aluminum is disposed between adjacent first and second claw poles 32a and 32b.

The rotor 32 includes a support member 32c. The support member 32c supports the first claw poles 32a and the second claw poles 32b. The support member 32c is attached to the turbine 22. When described in detail, the support member 32c is attached to the turbine hub 22c.

The field coil 33 is disposed radially inside the rotor 32. The field coil 33 has a cylindrical shape. The field coil 33 is opposed at the outer peripheral surface thereof to the inner peripheral surface of the rotor 32 at an interval. The field coil 33 is disposed in a non-rotatable manner. For example, the field coil 33 is attached to a housing or so forth.

The field coil 33 is configured to excite the rotor 32 by applying a magnetizing force to the rotor 32. Electric current to be supplied to the field coil 33 is regulated by a current control unit (not shown in the drawings), whereby the magnetizing force applied to the rotor 32 can be regulated, and further, induced voltage to be generated in the first stator 31 can be regulated.

When electric current is supplied to the field coil 33, the first and second claw poles 32a and 32b are excited. For example, the first claw poles 32a are excited into N poles, whereas the second claw poles 32b are excited into S poles. Thus, in the rotor 32, the N poles and the S poles are alternately arranged in the circumferential direction. When the rotor 32 is rotated, the induced voltage (induced electromotive force) is generated in the first stator 31.

Modification 4

In the preferred embodiment described above, the impeller 23 includes the first one-way clutch 23e. However, the composition of the impeller 23 is not limited to this. In other words, the impeller 23 may not include the first one-way clutch 23e. In this case, for instance, the impeller shell 23a is fixed to the impeller hub 23c by rivets and/or so forth.

Modification 5

In the preferred embodiment described above, the rotary electrical machine 3 is of an inner rotor type. Alternatively, the rotary electrical machine 3 can be of an outer rotor type.

Modification 6

The second one-way clutch 24d can be disposed on the second side of the center C2 of the torus of the torque converter 2 in the axial direction. In other words, the second one-way clutch 24d can be disposed on the second side of the stator blades 24b in the axial direction. In this case, the second one-way clutch 24d does not overlap the stator blades 24b in a radial view.

Modification 7

In the preferred embodiment described above, the piston plate 25a is configured to be unitarily rotated with the impeller hub 23c. However, the configuration of the piston plate 25a is not limited to this. For example, the piston plate 25a can be configured to be unitarily rotated with the impeller shell 23a.

Modification 8

In the preferred embodiment described above, the cover 21 is disposed on the first side of the turbine 22 in the axial direction. However, the structure of the torque converter 2 is not limited to this. For example, the cover 21 can be disposed on the second side of the turbine 22 in the axial direction. In other words, the turbine 22 and the cover 21 are disposed in this order from the engine side. In this case, the transmission shaft 4 penetrates the interior of the turbine hub 22c of the turbine 22. The turbine hub 22c herein corresponds to the inner tubular portion of the present invention.

REFERENCE SIGNS LIST

2 Torque converter
2a Input unit
2b Output unit
21 Cover
22 Turbine
23 Impeller
23a Impeller shell
23b Impeller blade
23c Impeller hub
23e First one-way clutch
25 Lock-up clutch device
3 Rotary electrical machine
31 First stator
32 Rotor
4 Transmission shaft
5 Damper device 51 Input plate
52 Output member
54 Elastic member
6a First bearing member
6b Second bearing member
7 Seal member
8 Angle sensor
9 Ring gear

What is claimed is:

1. A drive device comprising:
   a fluid coupling including an input unit and an output unit, the input unit including an impeller, the output unit including a turbine;
   a rotary electrical machine including a first stator and a rotor, the first stator disposed in a non-rotatable manner, the rotor attached to the output unit; and
   a damper device disposed axially adjacent to the fluid coupling, the damper device connected to the input unit.

2. The drive device according to claim 1, wherein
   the output unit includes a cover coupled to the turbine,
   the cover and the turbine form at least part of an outer shell of the fluid coupling, and
   the impeller is opposed to the turbine inside the outer shell.

3. The drive device according to claim 2, wherein the rotor is attached to the outer shell.

4. The drive device according to claim 2, further comprising:
   a transmission shaft extending to penetrate the outer shell, the transmission shaft connecting the damper device and the impeller to each other.

5. The drive device according to claim 4, further comprising:
   a first bearing member fixed to a crankshaft of an engine, the first bearing member supporting the transmission shaft such that the transmission shaft is rotatable.

6. The drive device according to claim 4, further comprising:
   a seal member; and
   a second bearing member, wherein
   the outer shell of the fluid coupling includes an inner tubular portion axially extending at an inner peripheral end thereof,
   the transmission shaft axially extends inside the inner tubular portion,
   the seal member is disposed between the inner tubular portion and the transmission shaft,
   the second bearing member is fixed to either a crankshaft of an engine or a member attached to the crankshaft, and
   the second bearing member supports the outer shell of the fluid coupling from radially outside such that the outer shell is rotatable.

7. The drive device according to claim 6, wherein the second bearing member supports the inner tubular portion such that the inner tubular portion is rotatable.

8. The drive device according to claim 1, wherein the fluid coupling further includes a lock-up clutch device configured to allow and block transmission of a torque between the input unit and the output unit.

9. The drive device according to claim 8, wherein
   the impeller includes
   an impeller shell,
   an impeller blade attached to the impeller shell,
   an impeller hub to which the torque is inputted, and
   a first one-way clutch disposed between the impeller shell and the impeller hub, and
   the lock-up clutch device is configured to be unitarily rotated with the impeller hub.

10. The drive device according to claim 1, wherein the impeller includes
    an impeller shell,
    an impeller blade attached to the impeller shell,
    an impeller hub to which a torque is inputted, and
    a first one-way clutch disposed between the impeller shell and the impeller hub.

11. The drive device according to claim 1, wherein the damper device includes
    an input plate attached to a crankshaft of an engine,
    an output member configured to output a torque to a transmission shaft, and
    an elastic member configured to elastically couple the input plate and the output member.

12. The drive device according to claim 11, wherein
    the elastic member is a coil spring, and
    a center of the elastic member does not overlap the rotor of the rotary electrical machine in an axial view.

13. The drive device according to claim 1, further comprising:
    a starter ring gear configured to transmit a power to a crankshaft of an engine, wherein
    the starter ring gear is disposed radially outside a coil end of the rotary electrical machine, the starter ring gear overlapping the coil end in a radial view.

14. The drive device according to claim 1, further comprising:
    an angle sensor disposed radially inside a center of a torus of the fluid coupling, the angle sensor disposed to overlap the torus in a radial view.

* * * * *